United States Patent [19]

Jakob et al.

[11] Patent Number: 4,920,201

[45] Date of Patent: Apr. 24, 1990

[54] ISOLATION OF PURIFIED SOLID POLYARYLENE SULFIDE DIRECTLY FROM POLYMERIZATION SOLUTION

[75] Inventors: Wolfgang Jakob, Moers; Erhard Tresper; Wolfgang Alewelt, both of Krefeld, all of Fed. Rep. of Germany

[73] Assignee: Bayer Aktiengesellschaft, Leverkusen, Fed. Rep. of Germany

[21] Appl. No.: 233,669

[22] Filed: Aug. 18, 1988

[30] Foreign Application Priority Data

Aug. 28, 1987 [DE] Fed. Rep. of Germany ....... 3728703

[51] Int. Cl.$^5$ .......................... C08G 75/02; C08J 11/04
[52] U.S. Cl. ...................................... 528/486; 528/388
[58] Field of Search ................................ 528/486, 388

[56] References Cited

U.S. PATENT DOCUMENTS

| | | | |
|---|---|---|---|
| 4,056,515 | 11/1977 | Vidaurri | 260/79.1 |
| 4,373,091 | 2/1983 | Edmonds | 528/481 |
| 4,748,231 | 5/1988 | Neshiwat | 528/486 |

FOREIGN PATENT DOCUMENTS 0096384 12/1983 European Pat. Off. .
0144987 6/1985 European Pat. Off. .

*Primary Examiner*—Harold D. Anderson
*Attorney, Agent, or Firm*—Connolly and Hutz

[57] ABSTRACT

This invention relates to a process for the preparation of crystalline polyarylenesulphides. Polyarylenesulphides with a high degree of purity, low electrolyte content and low non-uniformity are obtained. The polyarylenesulphides obtained have improved mechanical and electrical properties.

4 Claims, No Drawings

ISOLATION OF PURIFIED SOLID POLYARYLENE SULFIDE DIRECTLY FROM POLYMERIZATION SOLUTION

This invention relates to a process for the operation of crystalline polyarylenesulphides. Polyarylenesulphides are obtained by this process in a highly pure form with low electrolyte content and low non-uniformity. The polyarylenesulphides obtained also have improved mechanical and electrical properties.

The preparation of polyarylenesulphides and their isolation are known (e.g. U.S. Pat. No. 2 513 188). It is also known that the purity of the product depends to a large extent on the method employed for working it up (e.g. JP-A 1536 84).

According to U.S. Pat. No. 4 056 515, the solvents used for the preparation of the polyarylenesulphides may be distilled off and the salts may be removed by repeated washing with water from the polymer which is obtained as residue. In the said process, however, salts may be enclosed by the polymer matrix in the process of isolating the product. These enclosed salts cannot be dissolved out in subsequent stages of purification and remain in the product. They impair the properties of the polyarylenesulphides obtained so that the field of application of such polymers, e.g. in the electronics sector, is limited.

It is also known that the known processes give rise to polyarylenesulphides which contain a considerable proportion of oligomers and therefore lack uniformity.

It has been found that polyarylenesulphides with a low electrolyte content and high degree of uniformity (with a very low oligomer content) are obtained when salts of carboxylic acids, in particular salts of aminocarboxylic acids are added to the reaction solution after polycondensation.

The present invention therefore relates to a process for the isolation of polyarylenesulphide from a reaction solution obtained in known manner, characterised in that after polymerisation has been completed, salts of carboxylic acids, in particular of aminocarboxylic acids are added to the resulting mixture and the mixture is optionally cooled with stirring and the resulting suspension is filtered at an elevated temperature.

The polymer may be isolated from the resulting suspension by conventional methods of separation such as filtration, decanting or centrifuging.

The reaction solutions may be prepared, for example, according to U.S. Pat. No. 3 354 129 or DE-OS 3 601 215. According to the invention, the carboxylic acid salts are added to the reaction solutions after polymerisation has terminated and before the polymer is isolated. The salts used may be alkali metal salts (Li, Na, K) or alkaline earth metal salts (Ca, Mg) of organic acids such as benzoic acid, phthalic acid, and their homologues, aliphatic carboxylic acids or amino acids, e.g. propionic acid, butyric acid or adipic acid, preferably aminocarboxylic acids such as glycine, alanine, phenylalanine, aminobutyric acid, aminocaproic acid, etc., which may be used alone or as mixtures.

The temperature at which the salts of organic acids are added is generally in the region of the reaction temperature, optionally from 10 to 60 degrees Centigrade below this temperature. The addition according to the invention of carboxylic acid salts results in the separation of a polymer phase which solidifies to spherical aggregates when stirred. The formation and isolation of the solid may be assisted by further lowering of the temperature to 100°–220° C. The addition of the carboxylic acid salts is generally carried out at the pressures which become established at the given temperatures.

The quantity of carboxylic acid salts added depends on its molecular weight, the concentration of the reaction solution, the molecular weight of the dissolved polyarylenesulphide and the temperature of the reaction solution when the salt is added. It is in the range of from 1 to 50 mol-%, based on the quantity of p-dichlorobenzene put into the process, preferably from 20 to 40 mol-%.

The salts may be added neat in a solid or liquid form or they may be added as solutions and/or suspensions. Alternatively, the corresponding acids may be added and the salts may be produced in the reaction solution.

EXAMPLES

COMPARISON EXAMPLE 1

756.75 g of sodium sulphide hydrate (about 60%),
135 g of 2.5% sodium hydroxide solution and
108 g of caprolactam were added to
2100 g of N-methylcaprolactam and
940.8 g of p-dichlorobenzene
at a temperature of 220° C.

The rate of addition depends on the reaction rate and is adjusted to enable the temperature to be maintained at 220° C. with additional heating of the reaction vessel. Water is removed from the reaction mixture at the same time that the above reactants are added.

When all the components have been added and have then undergone reaction for 7 hours under slight reflux, the PPS is precipitated in water, washed free from electrolytes and briefly extracted with an organic solvent. The dried p-polyphenylenesulphide has a fusion viscosity of 45 Pas. (determined at $10^3$ Pa and 306° C.), a sodium content of 170 ppm and a non-uniformity of NU=3.71.

EXAMPLE 1

The procedure was analogous to that of Comparison Example 1 but in this case 294 g of sodium-N-methylaminocaproate were added to the reaction mixture at 230° C. after the period of after-reaction. The reaction mixture was then cooled to 170° C. with stirring and filtered at this temperature. The filtration residue was washed with 1000 g of N-methylcaprolactam and then with 6000 g of water.

A p-polyphenylenesulphide having a fusion viscosity of $\eta m=70$ Pas, a sodium content of <5 ppm Na and a non-uniformity of NU=1.87 was obtained after drying.

EXAMPLE 2

The procedure was the same as in Comparison Example 1 but the after-reaction was followed by the addition of 980 g of a 30% aqueous sodium N-methylaminocaproate solution to the reaction mixture at 230° C. at such a rate that the water immediately distilled off. When all this solution had been added, the reaction mixture was cooled to 160° C., filtered and washed as described in Example 1 and then dried.

The p-polyphenylenesulphide obtained had a fusion viscosity of $\eta m=67$ Pas, a sodium content of <5 ppm Na and a non-uniformity of 1.98.

We claim:

1. Process for the isolation of purified polyarylenesulphide as a solid polymer phase directly from a polymerization solution, the process characterized in that after termination of polymerization, salts of carboxylic acids are added to the polymerization solution with or without cooling or stirring and the resulting suspension is filtered at elevated temperatures to isolate the purified solid polymer from the polymerization solution.

2. Process according to claim 1, characterised in that aminocarboxylic acid salts are added.

3. Process according to claim 1, characterised in that the temperature of the reaction solution is lowered by 10 to 60 degrees Centigrade before addition of the salt.

4. Process according to claim 1, characterised in that the polyarylenesulphide is isolated from the suspension at temperatures from 100° to 220° C.

* * * * *